US012602361B2

(12) United States Patent
Shu et al.

(10) Patent No.: US 12,602,361 B2
(45) Date of Patent: Apr. 14, 2026

(54) SELECTING INDEXING ALGORITHMS FOR AUTOMATED EMBEDDING DATABASE GENERATION

(71) Applicant: Maplebear Inc., San Francisco, CA (US)

(72) Inventors: Guanghua Shu, Sunnyvale, CA (US); Jacob Jensen, Metuchen, NJ (US); Ankit Mittal, Whitby (CA); Li Tan, Fremont, CA (US); Haixun Wang, Bellevue, WA (US); Andrew Tanner, Toronto (CA); Alex Charlton, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/772,780

(22) Filed: Jul. 15, 2024

(65) Prior Publication Data

US 2026/0017243 A1     Jan. 15, 2026

(51) Int. Cl.
*G06F 16/22* (2019.01)
(52) U.S. Cl.
CPC ................................ *G06F 16/2228* (2019.01)
(58) Field of Classification Search
None
See application file for complete search history.

(56) References Cited

U.S. PATENT DOCUMENTS

| | | | |
|---|---|---|---|
| 12,340,410 B1 * | 6/2025 | Gates | G06F 40/279 |
| 12,386,994 B1 * | 8/2025 | DeWeese | G06F 21/6227 |
| 2011/0145175 A1 * | 6/2011 | Agarwal | G06N 20/10 |
| | | | 706/12 |
| 2021/0319179 A1 | 10/2021 | Muffat | |
| 2022/0253871 A1 | 8/2022 | Miller et al. | |
| 2024/0119008 A1 * | 4/2024 | Krishnan | G06N 20/00 |
| 2024/0176992 A1 | 5/2024 | Chen | |
| 2024/0320951 A1 * | 9/2024 | Deep | G06V 10/75 |

(Continued)

OTHER PUBLICATIONS

Patent Cooperation Treaty, International Search Report and Written Opinion, PCT Application No. PCT/US2025/037142, Sep. 22, 2025, 13 pages.

*Primary Examiner* — Aleksandr Kerzhner
*Assistant Examiner* — Anugeetha Kunjithapatham
(74) *Attorney, Agent, or Firm* — Fenwick & West LLP

(57) ABSTRACT

An online system uses benchmarking tests to identify indexing algorithms for an embedding database. To perform these benchmarking tests, the online system receives a set of parameters for configuring an embedding database. For example, the parameters may include a performance parameter and a latency parameter. The online system generates algorithm scores for a set of candidate indexing algorithms based on the parameters. Specifically, the online system tests each of the candidate indexing algorithms by generating a testing database based on a subset of the entries for the full database and by performing benchmarking tests on the testing database. The online system uses these tests to compute performance metrics for each candidate indexing algorithm and uses those performance metrics to compute an algorithm score for each indexing algorithm. The online system uses the computed algorithm scores to select an indexing algorithm for the embedding database.

15 Claims, 4 Drawing Sheets

(56) References Cited

U.S. PATENT DOCUMENTS

| | | | | |
|---|---|---|---|---|
| 2024/0414017 A1* | 12/2024 | Lee | ................... | G06F 16/90332 |
| 2025/0054120 A1* | 2/2025 | Ming | ..................... | G06V 10/44 |
| 2025/0225402 A1* | 7/2025 | Gross | ....................... | G06N 3/09 |
| 2025/0232567 A1* | 7/2025 | Coleman | .............. | G06V 10/774 |

* cited by examiner

Access Entries and Parameters for Embedding Database
300

Access Candidate Indexing Algorithms
310

Generate Algorithm Scores for Candidate Indexing Algorithms
using Benchmarking Tests
320

Select Indexing Algorithms based on Algorithm Scores
330

Store Entries in Database using Indexing Algorithms
340

SELECTING INDEXING ALGORITHMS FOR AUTOMATED EMBEDDING DATABASE GENERATION

BACKGROUND

Online systems use embeddings to represent information that the systems use with their machine-learning models or other sub systems of the online system. For example, an online system may use an embedding to represent a user when selecting content to present to the user. Online systems use neural networks to generate an embedding based on feature data. However, since these neural networks may include millions of parameters, generating an embedding can require a significant amount of computing resources.

To reduce the resource consumption of using embeddings, online systems will generate embedding databases that store already-generated embeddings for reuse by the system. For example, the online system may generate an embedding for a user based on data describing the user and cache that embedding in a database for later use. The online system may also use an indexing algorithm to organize the database entries that store the embeddings to improve the efficiency in finding relevant embeddings stored in the databases. However, different indexing algorithms can have different benefits and drawbacks. For example, one indexing algorithm may enable faster lookups for entries whereas another may be more accurate in identifying relevant embeddings. Generally, engineers must use their own expertise to identify an ideal indexing algorithm for an embedding database, but oftentimes this expertise requires some guesswork on the engineer's part. Thus, indexing algorithms for embedding databases generally require additional expertise from an engineer to identify or are improper for their use case.

SUMMARY

In accordance with one or more aspects of the disclosure, an online system uses benchmarking tests to identify indexing algorithms for an embedding database. To perform these benchmarking tests, the online system receives a set of parameters for configuring an embedding database. For example, the parameters may include a performance parameter and a latency parameter. The performance parameter is a measure of an expected performance (e.g., accuracy) of a subsystem that uses the embedding database to be built by the system, and the latency parameter is a measure of how long it takes for the embedding database to retrieve embeddings. The online system may receive these parameters from an engineer or developer of a subsystem that will use the embedding database.

The online system generates algorithm scores for a set of candidate indexing algorithms based on the parameters. Specifically, the online system tests each of the candidate indexing algorithms by generating a testing database based on a subset of the entries for the full database and by performing benchmarking tests on the testing database. For example, the online system may apply testing examples to the subsystem while the subsystem is using the testing database and may compare the output of the subsystem with expected results (e.g., labels). The online system uses these tests to compute performance metrics for each candidate indexing algorithm and uses those performance metrics to compute an algorithm score for each indexing algorithm. The online system uses the computed algorithm scores to select an indexing algorithm for the embedding database.

By performing benchmarking tests to select an indexing algorithm for an embedding database, the online system can more effectively select an indexing algorithm that will suit the needs of the subsystem using the embedding database. Additionally, the online system can generate the embedding database with reduced human input in how to configure the database.

DETAILED DESCRIPTION

Figure 1:
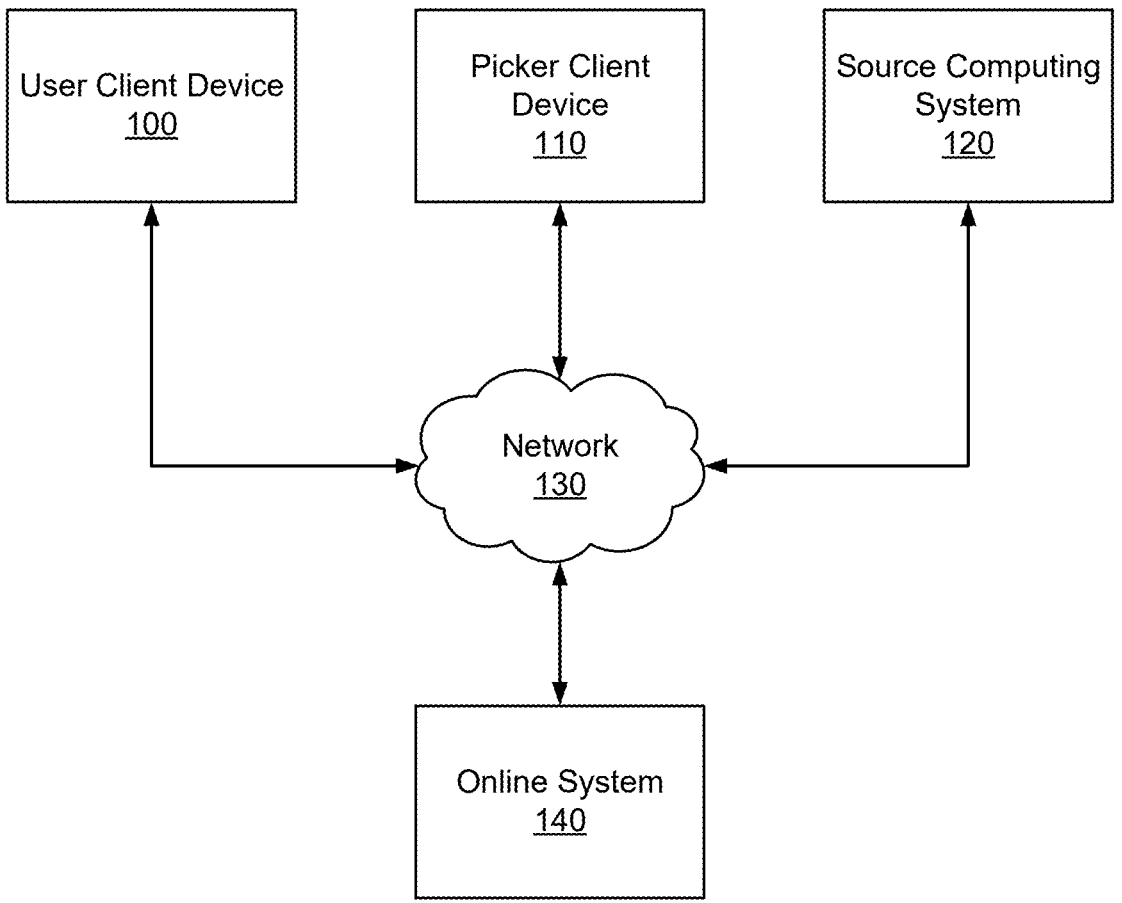
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

Figure 2:
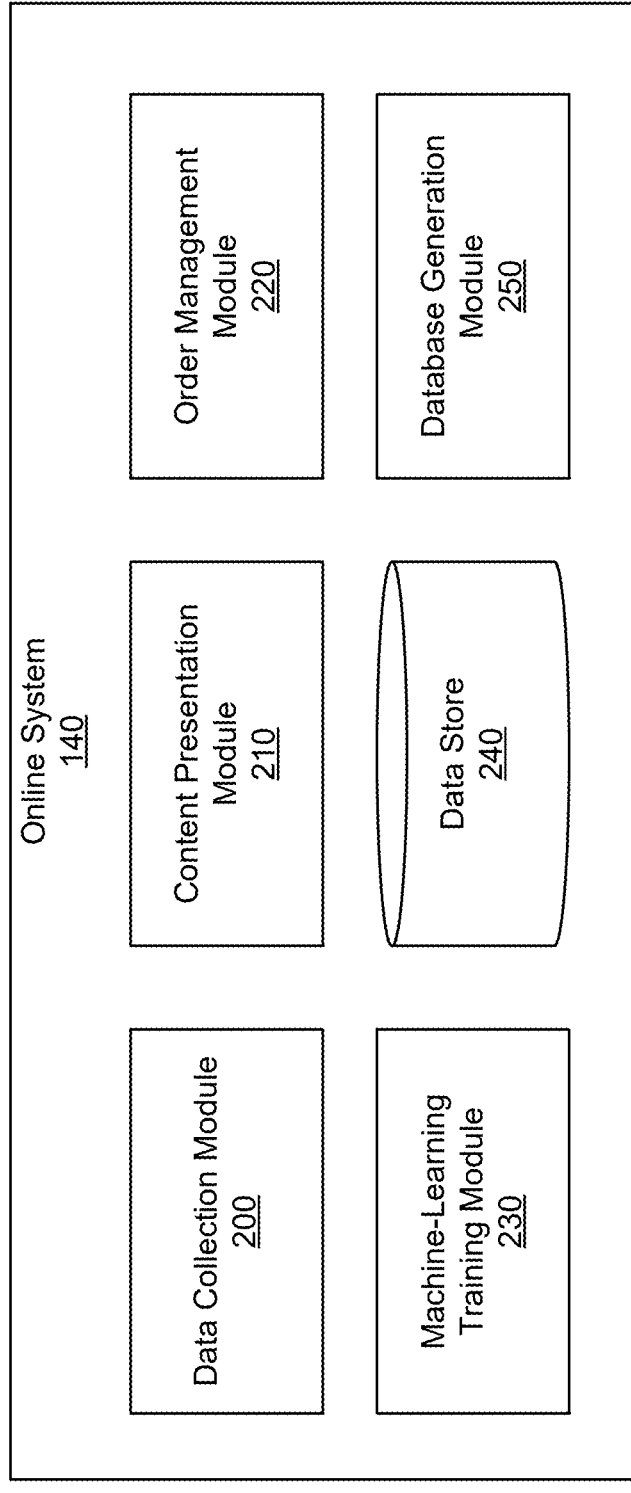
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model.

Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The database generation module 250 automatically generates embedding databases for different subsystems within the online system. The database generation module 250 uses benchmarking tests to identify indexing algorithms for an embedding database. To perform these benchmarking tests, the database generation module 250 receives a set of parameters for configuring an embedding database. For example, the parameters may include a performance parameter and a latency parameter. The database generation module 250 generates algorithm scores for a set of candidate indexing algorithms based on the parameters. Specifically, the database generation module 250 tests each of the candidate indexing algorithms by generating a testing database based on a subset of the entries for the full database and by performing benchmarking tests on the testing database. The database generation module 250 uses these tests to compute performance metrics for each candidate indexing algorithm and uses those performance metrics to compute an algorithm score for each indexing algorithm. The database generation module 250 uses the computed algorithm scores to select an indexing algorithm for the embedding database.

Figure 3:
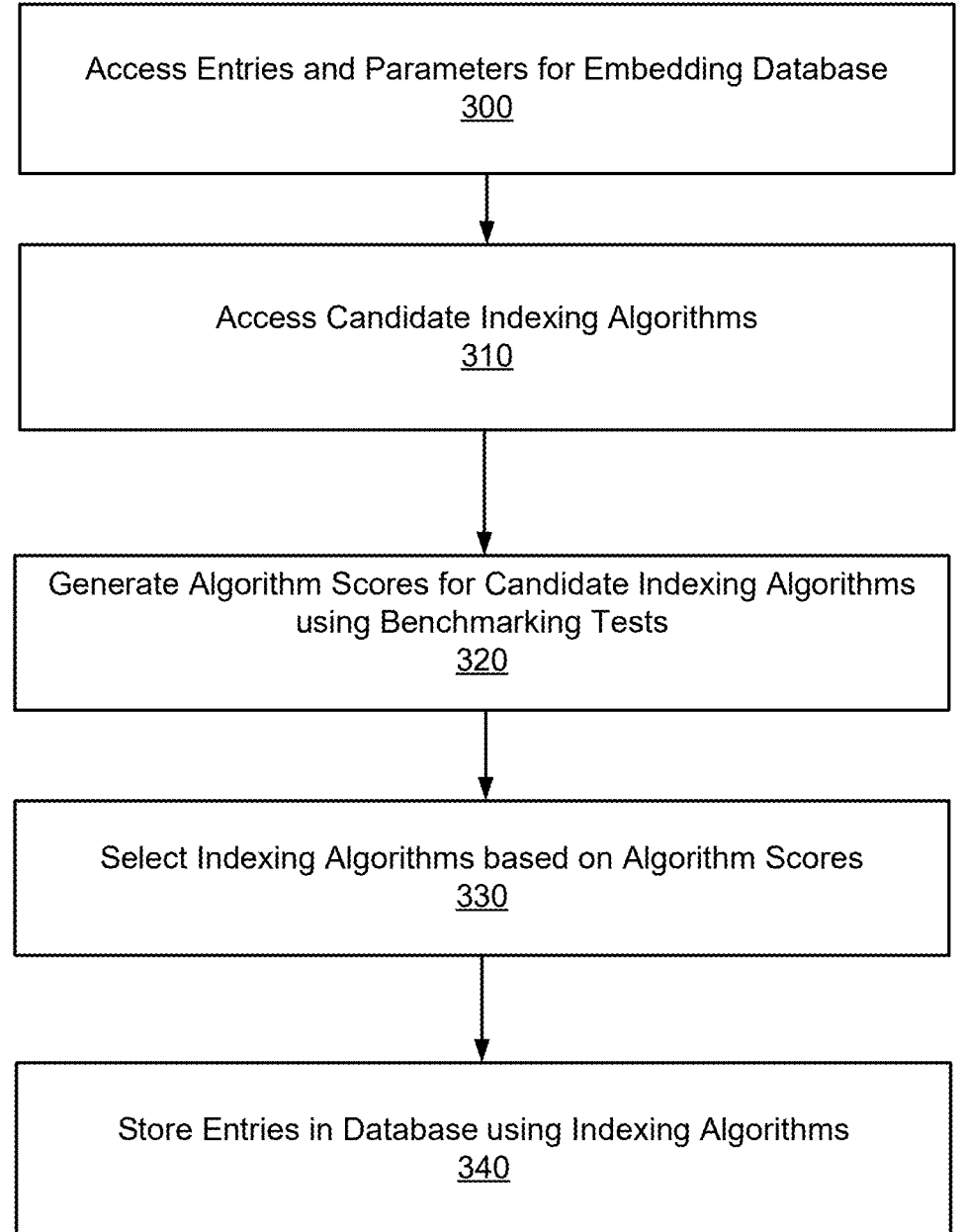
FIG. 3 is a flowchart for a method of testing indexing algorithms to automatically generate an embedding database, in accordance with some embodiments.

FIG. 3 is a flowchart for a method of testing indexing algorithms to automatically generate an embedding database, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

An online system automates the deployment of an embedding database by automatically selecting a candidate indexing approach that suits the requirements of an application. Traditional systems require a user to manually select an ideal indexing algorithm to balance between the accuracy and latency of a corresponding machine learning model. An indexing algorithm is a technique for identifying indexes. An index stores mappings between items and their corresponding embeddings.

The online system accesses 300 a set of parameters and a set of candidate indexing algorithms for an embedding database. An embedding database is a system that manages and stores data embeddings. For example, the embedding database may store embeddings used by a machine learning model that is used by the online system 140 for some application of the system. An embedding database may store embeddings for a single type of data or multiple types of data.

The online system accesses a set of embedding entries to be stored by the embedding database. An embedding entry is a database entry that stores an embedding in association with an identifier for that embedding. The embedding identifier identifies the embedding entry and the embedding within the embedding database. The embedding entry also includes a content identifier. The content identifier identifies the content that the embedding represents. For example, if the embedding represents an item, the content identifier may identify which item the embedding represents. In some embodiments, the content identifier corresponds to an entry in a database that stores the corresponding content.

The online system also accesses a set of parameters to configure the embedding database platform. Some embedding database parameters include dimensions of an embedding, precisions of the embedding vectors, ML training parameters (e.g., learning rates, batch size, epochs), algorithms for generating the embedding (e.g., word2Vec, BERT), and a vocabulary size to specify the number of unique tokens or entities in the vocabulary for which embeddings will be stored.

The set of parameters also includes a latency parameter and a performance parameter. The latency parameter is a parameter that measures how much time the embedding database takes to retrieve embeddings. For example, the latency parameter may represent a mean, median, or mode amount of time for the embedding database to service queries for embeddings.

The performance parameter is a parameter that measures the performance of a subsystem of the online system that uses embeddings from the embedding database. For example, the performance parameter may represent the precision, recall, or accuracy of that subsystem. The subsystem corresponding to the performance parameter is a subsystem of the online system 140 that uses embeddings from an embedding database as part of its functionality. For example, the subsystem may be an application executed by the online system that selects content to present to users based on embeddings from an embedding database. The subsystem may include a machine-learning model that is applied to the embeddings. In some embodiments, the subsystem is a system that performs some or all of the functions of the data collection module 200, the content presentation module 210, the order management module 220, the machine-learning training module 230, or the data store 240.

The online system may receive the set of parameters for the embedding database from a developer of a subsystem within the online system. As explained above, the online system may automate the configuration of a new embedding database for a subsystem. To ensure the new embedding database is configured to effectively service the subsystem that the developer is developing or has built, the developer provides the set of parameters, such as the latency and performance parameters, to the online system for use in configuring the embedding database.

The online system accesses 310 a set of candidates indexing algorithms. An indexing algorithm specifies metadata and data structures for the embedding database to enable efficient and accurate retrieval of entries in the database. Example indexing algorithms include k-dimensional trees, r-trees, clustering, locality-sensitive hashing (LSH), hierarchical navigable small worlds (HNSW) graphs, and product quantization.

In some embodiments, the online system filters the set of candidate indexing algorithms to reduce the number of candidate indexing algorithms to test. To filter the set of candidate indexing algorithms, the online system accesses a set of heuristics for filtering the candidate index algorithms. As an example, the set of heuristics may filter candidate indexing algorithms based on which search algorithm will be used to search for embeddings in the embedding database. For example, the online system may identify a search algorithm to be used to search the embedding database for embeddings based on the set of parameters. For example, if the latency parameter and performance parameter indicate that the subsystem prioritizes latency over performance, the online system may identify approximate nearest neighbors as a search algorithm to be used to search for embeddings. Similarly, if the latency parameter and performance parameter indicate that the subsystem prioritizes performance over latency, the online system may identify k-nearest neighbors as a search algorithm to be used to search for embeddings. The online system may filter out candidate indexing algorithms that do not perform well with the identified search algorithm. These heuristics may thereby act as guidelines for the online system to filter the set of candidates indexing algorithms.

The online system generates 320 an algorithm score for each of the candidate indexing algorithms. An algorithm score represents how well a candidate indexing algorithm meets the set of parameters received from the operator of the online system. The online system computes an algorithm score for an indexing algorithm using a benchmarking process. The online system initializes a test database using the indexing algorithm and evaluates the performance of the test database and a subsystem of the online system that will use the to-be-generated embedding database through a benchmarking process.

To perform the benchmarking process for a candidate indexing algorithm, the online system initializes a test database using the candidate indexing algorithm. The test database is a database that stores a subset of the accessed embeddings entries and stores those entries in accordance with the corresponding candidate indexing algorithm. The online system can query the test database to retrieve embedding entries in the subset during the benchmarking process. The online system may receive an indication from a developer as to which embedding entries to include in the test database. Alternatively, the online system may select the subset of embedding entries itself. For example, the online system may randomly select a subset of the accessed embedding entries to include in the test database.

The online system uses the test database to provide embeddings to the subsystem while testing the subsystem using a set of testing examples. Each testing example includes input data to the subsystem and a label indicating an expected result from the subsystem using the corresponding input data. For example, if the subsystem selects a set of items to include in a user's search results, a testing example may include user data describing the user and a label indicating which items the subsystem would ideally select.

To test the subsystem using a testing example, the online system uses the input data to generate a query for the test database. The test database retrieves a set of embeddings based on the generated query. The subsystem uses the set of embeddings to perform its corresponding functionality. For example, where the subsystem presents search results to a user based on the user's data, the subsystem may use the retrieved set of embeddings to identify items to present to the user in the search results. To compute a score for the indexing algorithm, the online system tests the subsystem and logs the output of the testing example. As an example of the subsystem for determining a set of items to present to the user in the search result, the online system logs the items presented to the user. The log may also include whether a user indicated positively to the presented items. The user may positively indicate an item by logging when a user interacted with the item by, for example, adding the item to the user's cart, clicking on the item, or indicating on a presented user interface. The benchmarking process determines the score for each candidate indexing algorithm in terms of a received metric.

The online system compares the logged output of the indexing algorithm with the label for the training example. This comparison may accordingly score the indexing algorithms. For instance, the online system scores the indexing algorithms higher based on the percentage of correctly identified items presented to the user by the test database. A correctly identified item presented to the user corresponds to an item selected by the database that has been labeled by the training example.

Figure 4:
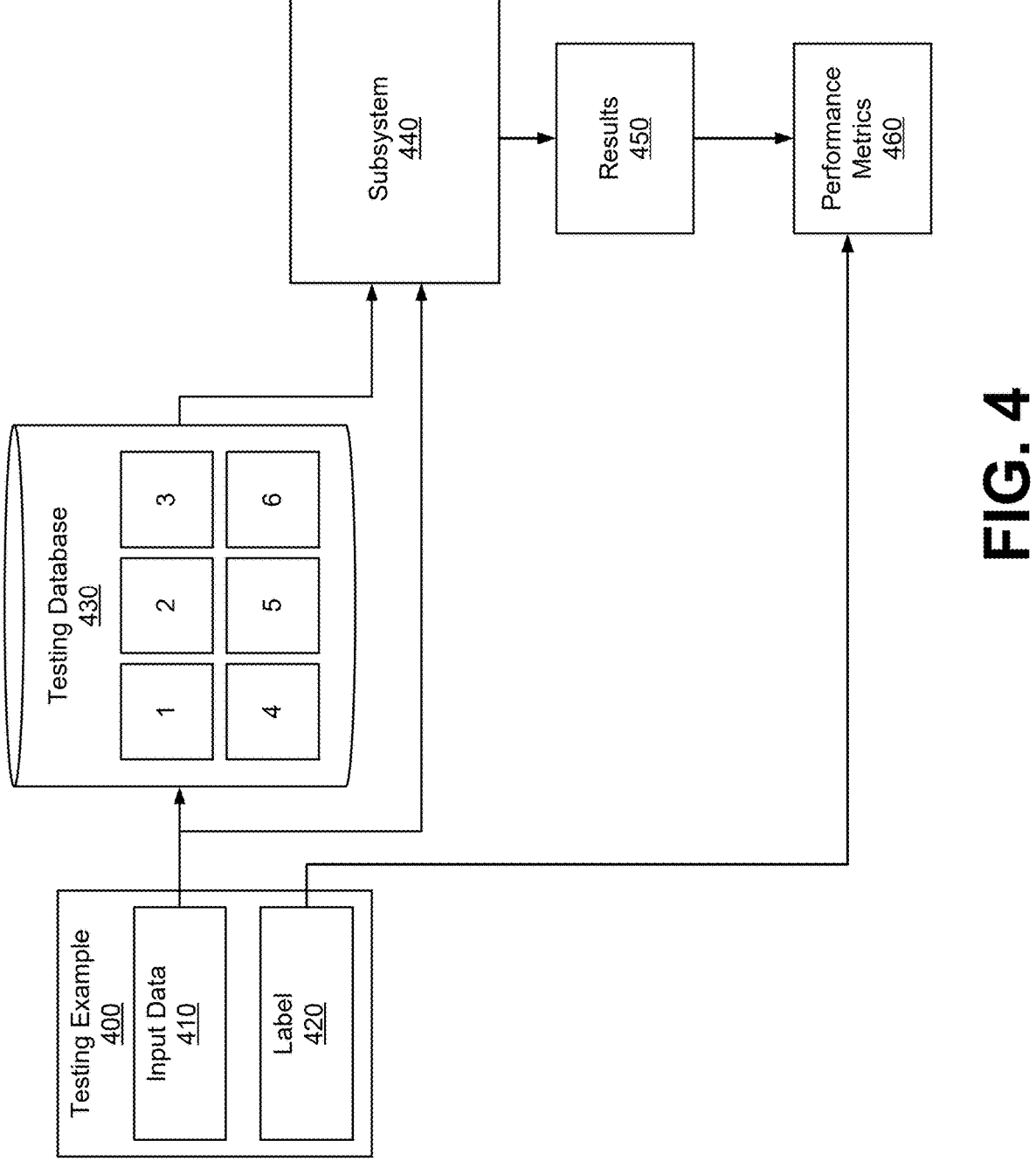
FIG. 4 illustrates an example data flow in the online system as part of a benchmarking process, in accordance with some embodiments.

FIG. 4 illustrates an example data flow in the online system as part of a benchmarking process, in accordance with some embodiments. The online system receives a testing example 400 that has input data 410 to the subsystem and a label 420 that represents an ideal output of the subsystem based on the corresponding input data. For example, the input data may be user data for a user (or an embedding for a user) and the label may be indications for which content items the user would interact with. The online system uses the input data 410 to request a set of candidate embeddings from the testing database 430. The testing database 430 contains a subset of the embedding entries for the final embedding database and is indexed based on one of the candidate indexing algorithms. The online system uses the embeddings selected from the testing database 430 to execute the subsystem 440 associated with the testing database. The subsystem generates a set of results 450 and the online system compares the set of results to the label 420 to compute performance metrics 460 for the candidate indexing algorithm used to index the testing database 430.

To compare the candidate indexing algorithms, the online system ranks the algorithms according to the received algorithm score. As an example, the online system 140 generates a score by applying a function to the computed metrics of the candidate indexing algorithm. The online system may also generate a score by a weighted sum for each candidate indexing algorithm for a received set of weighting factors for each candidate indexing algorithm. Further, the online system may score the candidate indexing algorithms by determining whether a latency metric meets a minimum latency parameter.

The online system compares the generated scores for the algorithms to select 330 an indexing algorithm. For example, the online system may rank the candidate indexing algorithms based on the algorithm scores and select an indexing algorithm that has the highest score. The online system builds the full database by storing 340 the accessed set of embedding entries based on the selected indexing algorithm. The online system provides the embedding database for use by the subsystem for which the embedding database was generated.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed by a computing system comprising a processor and a non-transitory computer-readable medium, comprising:

accessing, by an online system, a set of embedding entries and a set of parameters for an embedding database, wherein embedding entries comprise an embedding and an identifier for an object associated with the embedding, and wherein the set of parameters comprise a performance parameter for a content-serving subsystem of the online system, wherein the content-serving subsystem is a system that uses embeddings from the set of embedding entries, and wherein the performance parameter represents an performance of the content-serving subsystem while using embedding from the set of embedding entries;

accessing, by the online system, a set of candidate indexing algorithms for the embedding database, wherein each candidate indexing algorithm is an indexing algorithm for indexing embeddings within a database;

generating, by the online system, an algorithm score for each candidate indexing algorithm, wherein an algorithm score represents a measure of compliance with the set of parameters of the corresponding candidate indexing algorithm, wherein generating an algorithm score for a candidate indexing algorithm comprises:

initializing, by the online system, a testing embedding database in accordance with the candidate indexing algorithm; and performing, by the online system, a set of benchmarking tests on the testing embedding database to generate one or more performance metrics for the candidate indexing algorithm, wherein performing the set of benchmark tests comprises:

accessing a plurality of testing examples, wherein each testing example of the plurality of testing examples comprises input data for the content-serving subsystem and a label indicating an expected output of the content-serving subsystem for the corresponding input data;

for each of the plurality of testing examples:

inputting the input data to the content-serving subsystem;

executing the content-serving subsystem using the testing embedding database;

receiving an output from the content-serving subsystem; and comparing the output to the label of the testing example; and generating the one or more performance metrics based on the comparisons of the outputs to the labels of the plurality of testing examples;

selecting, by the online system, an indexing algorithm of the set of candidate indexing algorithm based on the generated algorithm scores; and storing, by the online system, the set of embedding entries in the embedding database using the selected indexing algorithm.

2. The method of claim 1, wherein accessing the set of candidate indexing algorithms comprises:

filtering a plurality of candidate indexing algorithms based on a set of heuristics.

3. The method of claim 2, wherein filtering the plurality of candidate indexing algorithms comprises:

identifying a searching algorithm to use for the embedding database based on the set of parameters; and filtering the plurality of candidate indexing algorithms based on the identified search algorithm.

4. The method of claim 1, wherein the set of candidate indexing algorithm comprises at least one of k-dimensional trees, r-trees, locality-sensitive hashing (LSH), hierarchical navigable small worlds (HNSW) graphs, or product quantization.

5. The method of claim 1, wherein the set of parameters comprises a latency parameter.

6. A non-transitory computer-readable medium storing instructions that, when executed by a processor, cause the processor to perform operations comprising:

accessing, by an online system, a set of embedding entries and a set of parameters for an embedding database, wherein embedding entries comprise an embedding and an identifier for an object associated with the embedding, and wherein the set of parameters comprise a performance parameter for a content-serving subsystem of the online system, wherein the content-serving subsystem is a system that uses embeddings from the set of embedding entries, and wherein the performance parameter represents an performance of the content-serving subsystem while using embedding from the set of embedding entries;

accessing, by the online system, a set of candidate indexing algorithms for the embedding database, wherein each candidate indexing algorithm is an indexing algorithm for indexing embeddings within a database;

generating, by the online system, an algorithm score for each candidate indexing algorithm, wherein an algorithm score represents a measure of compliance with the set of parameters of the corresponding candidate indexing algorithm, wherein generating an algorithm score for a candidate indexing algorithm comprises:

initializing, by the online system, a testing embedding database in accordance with the candidate indexing algorithm; and performing, by the online system, a set of benchmarking tests on the testing embedding database to generate one or more performance metrics for the candidate indexing algorithm, wherein performing the set of benchmark tests comprises:

accessing a plurality of testing examples, wherein each testing example of the plurality of testing examples comprises input data for the content-serving subsystem and a label indicating an expected output of the content-serving subsystem for the corresponding input data;

for each of the plurality of testing examples:

inputting the input data to the content-serving subsystem;

executing the content-serving subsystem using the testing embedding database;

receiving an output from the content-serving subsystem; and comparing the output to the label of the testing example; and generating the one or more performance metrics based on the comparisons of the outputs to the labels of the plurality of testing examples;

selecting, by the online system, an indexing algorithm of the set of candidate indexing algorithm based on the generated algorithm scores; and storing, by the online system, the set of embedding entries in the embedding database using the selected indexing algorithm.

7. The non-transitory computer-readable medium of claim 6, wherein accessing the set of candidate indexing algorithms comprises:

filtering a plurality of candidate indexing algorithms based on a set of heuristics.

8. The non-transitory computer-readable medium of claim 7, wherein filtering the plurality of candidate indexing algorithms comprises:

identifying a searching algorithm to use for the embedding database based on the set of parameters; and filtering the plurality of candidate indexing algorithms based on the identified search algorithm.

9. The non-transitory computer-readable medium of claim 6, wherein the set of candidate indexing algorithm comprises at least one of k-dimensional trees, r-trees, locality-sensitive hashing (LSH), hierarchical navigable small worlds (HNSW) graphs, or product quantization.

10. The non-transitory computer-readable medium of claim 6, wherein the set of parameters comprises a latency parameter.

11. A system comprising:

a processor; and a non-transitory computer-readable medium storing instructions that, when executed by a processor, cause the processor to perform operations comprising:

accessing, by an online system, a set of embedding entries and a set of parameters for an embedding database, wherein embedding entries comprise an embedding and an identifier for an object associated with the embedding, and wherein the set of parameters comprise a performance parameter for a content-serving subsystem of the online system, wherein the content-serving subsystem is a system that uses embeddings from the set of embedding entries, and wherein the performance parameter represents an performance of the content-serving subsystem while using embedding from the set of embedding entries;

accessing, by the online system, a set of candidate indexing algorithms for the embedding database, wherein each candidate indexing algorithm is an indexing algorithm for indexing embeddings within a database;

generating, by the online system, an algorithm score for each candidate indexing algorithm, wherein an algorithm score represents a measure of compliance with the set of parameters of the corresponding candidate indexing algorithm, wherein generating an algorithm score for a candidate indexing algorithm comprises:

initializing, by the online system, a testing embedding database in accordance with the candidate indexing algorithm; and performing, by the online system, a set of benchmarking tests on the testing embedding database to generate one or more performance metrics for the candidate indexing algorithm, wherein performing the set of benchmark tests comprises:

accessing a plurality of testing examples, wherein each testing example of the plurality of testing examples comprises input data for the content-serving subsystem and a label indicating an expected output of the content-serving subsystem for the corresponding input data;

for each of the plurality of testing examples:

inputting the input data to the content-serving subsystem;

executing the content-serving subsystem using the testing embedding database;

receiving an output from the content-serving subsystem; and comparing the output to the label of the testing example; and generating the one or more performance metrics based on the comparisons of the outputs to the labels of the plurality of testing examples;

selecting, by the online system, an indexing algorithm of the set of candidate indexing algorithm based on the generated algorithm scores; and storing, by the online system, the set of embedding entries in the embedding database using the selected indexing algorithm.

12. The system of claim 11, wherein accessing the set of candidate indexing algorithms comprises:

filtering a plurality of candidate indexing algorithms based on a set of heuristics.

13. The system of claim 12, wherein filtering the plurality of candidate indexing algorithms comprises:

identifying a searching algorithm to use for the embedding database based on the set of parameters; and filtering the plurality of candidate indexing algorithms based on the identified search algorithm.

14. The system of claim 11, wherein the set of candidate indexing algorithm comprises at least one of k-dimensional trees, r-trees, locality-sensitive hashing (LSH), hierarchical navigable small worlds (HNSW) graphs, or product quantization.

15. The system of claim 11, wherein the set of parameters comprises a latency parameter.

* * * * *